(12) United States Patent
Park

(10) Patent No.: US 7,554,884 B2
(45) Date of Patent: Jun. 30, 2009

(54) SIMPLICITY SONIC DEPTH FINDER FOR FISHING

(76) Inventor: Kyo-Yang Park, 403-303 Gangbuk APT, Eunahngmaeul, 4dong Gyesan, Gyeyang-gu, Incheon Metropolitan City (KR)

( * ) Notice: Subject to any disclaimer, the term of this patent is extended or adjusted under 35 U.S.C. 154(b) by 37 days.

(21) Appl. No.: 11/593,158

(22) Filed: Nov. 6, 2006

(65) Prior Publication Data

US 2007/0147173 A1 Jun. 28, 2007

(30) Foreign Application Priority Data

Nov. 4, 2005 (KR) .................... 10-2005-0105518

(51) Int. Cl.
*G01S 15/96* (2006.01)
(52) U.S. Cl. .................................... 367/107
(58) Field of Classification Search ............ 367/99, 367/107, 108, 141; 43/4–57.3
See application file for complete search history.

(56) References Cited

U.S. PATENT DOCUMENTS

| | | | | |
|---|---|---|---|---|
| 4,805,337 | A * | 2/1989 | Kurata | 43/17.5 |
| 5,406,734 | A * | 4/1995 | Ho et al. | 43/17.1 |
| 6,693,847 | B2 * | 2/2004 | Betts | 367/3 |
| 2006/0218843 | A1 * | 10/2006 | Sanchez et al. | 43/17 |
| 2007/0147173 | A1 * | 6/2007 | Park | 367/107 |

* cited by examiner

*Primary Examiner*—Dan Pihulic
(74) *Attorney, Agent, or Firm*—Baker & Hostetler LLP

(57) ABSTRACT

Provided is a detector for fishing in order to detect the depth of water, the temperature of water, the distribution of fishes including fishes' migration and/or the length of fishes. The detector includes: a sensor transmitting an ultrasonic signal into the water in a fishing site and receiving a reflective ultrasonic signal reflected from an underwater object; a control unit analyzing/determining the waveform of the reflective ultrasonic signal measured in the sensor to then be indicated on an indication unit including a light-emission indicator, a numeric indicator, and a water depth/temperature indicator; a switching unit having an elevating rod whose lower end contacts an activation switch to turn on/off electric power supplied from a power source and in the upper end of which a fishing line engagement hole is formed in which a fishing line is connected with the fishing line engagement hole and the elevating rod is exposed to the outside to then be elastically pressed to be opened and closed according to the pressure of the elevating rod; and a main body on the upper surface of which a light-emission indicator, a numeric indicator, and a water depth/temperature indicator are formed, and in which the sensor, the control unit, and the switching unit are embedded in a sealed manner with a predetermined structure. The detector further includes a transmitter transmitting a signal representing the analyzed/determined result in the form of a predetermined waveform wirelessly. The wireless signal transmitted from the transmitter in the fishing detector is received and displayed using a predetermined program via a predetermined receiver having a display such as a personal portable communications terminal like a mobile telephone.

15 Claims, 8 Drawing Sheets

SIMPLICITY SONIC DEPTH FINDER FOR FISHING

CROSS-REFERENCE TO RELATED PATENT APPLICATION

This application claims the benefit of Korean Patent Application No. 00-2005-000000, filed on Nov. 4, 2005, in the Korean Intellectual Property Office, the disclosure of which is incorporated herein in its entirety by reference.

BACKGROUND OF THE INVENTION

1. Field of the Invention

The present invention relates to a detector for fishing, and more particularly, to a fishing detector which detects the depth of water, the temperature of water, the distribution of fishes, and/or the length of fishes at a fishing spot, to thereby immediately indicate the detection results in various kinds of methods or display the detection result on a portable mobile communications terminal in order to represent a density of waveform corresponding to the detection results.

2. Description of the Related Art

Conventionally known detectors for detecting fishes, which are called sonar, are fishing-vessel dedicated devices. The detectors are being widely used as detection devices which detect the depth of water and the moving range of fish in the deep sea to thereby enable fishers to catch the fishes by means of a fishing net etc.

However, the detector is too expensive to use it for fishing. It is also unfit to use the detector for leisure in view of its cost and place where it is used.

Simple detectors for fishing which have been designed to solve the above-described conventional limitations have been known.

First, a detector which is known as a water depth measuring device for fishing which is called an echo-sounding device will be described below.

The water depth measuring device for fishing is floated on water in the form of a floater on which a sinker is hung to thereby measure the depth of water. However, it is complicated and inconvenient to use a string for drawing out a sinker while maintaining a stabilized buoyancy between a sinker and a floater. Further, the depth of water is measurable but the water temperature or the distribution range of the fishes cannot be measured.

Moreover, a device for converting distribution of underwater fishes into an image signal using ultrasonic waves utilizing piezoelectric ceramics for underwater image acquisition has been commercialized. However, such an underwater image acquisition device is relatively big in volume and expansive in price. Thus, the underwater image acquisition device is being restrictively used only for the underwater photography, and has not been reasonable to be used as a leisure fishing device.

Examples of underwater sound detectors for locating fishes are found in U.S. Pat. Nos. 5,463,597, 5,495,689, 5,546,695, 5,887,376 and 6,122,852 for fishers who do fishing in the river embankment or the seashore. These are respectively formed of a quill or float in which an underwater sound navigator is generally mounted, and which is connected to a fishing rod via a transmission line. The transmission line may be lengthily extended to a display screen connected to a fisher from the float. Accordingly, the fisher can identify the status of underwater fishes and the state of the underwater bottom which have been received and transmitted from the float having the underwater sound detector while he or she stays on the river embankment and or seashore. It has been known that the float is hung on a fish hook to which a feed is attached, or is connected to a fishing rope itself. There have been known a variety of kinds of the floats like the above-referenced U.S. patents. However, these are not also used as a simplified commercialized fishes locating device for leisure.

One of the key issue points of the detectors which are respectively attached on a fishing rod is caused by the length of a cable such as a fishing rope in which the distance throwing the fishing rope from the fishing rod is short. The other problems include rapid power consumption, errors of a display device, intermittently ceased echo signals, and interference phenomena due to similar detectors which are being used in the same place by the other fishers. Moreover, the detectors and the fishing ropes lengthily overhang between the float and the river embankment or seashore, to thus cause a complexity in the fishing site. Further, the fishing rope may happen to be tangled with the transmission line for the sound detector, during a reeling. Although a reeling is not performed, the fishing rope may be easily tangled with the transmission line for the sound detector when the fishing rope becomes tight or loose during fishing. Further, since the underwater sound detector should consistently move between the screen and the float, the above-described problems may frequently occur.

In order to improve the problems of such existing U.S. patents, one recently issued U.S. Pat. No. 6,771,562 provides a portable fish finder that consumes minimal power, that displays more reliable underwater states, and which can avoid interference with another portable fish finders in close proximity. Moreover, the fish finding method is usable in conjunction with sport fishing wherein a fisherman grips a fishing rod while viewing sonar returns in his fishing area that are displayed on a screen detachably secured to his wrist or to his fishing rod. Further, the fish finding system includes a buoyant station having a sonar to electric signal transducer for converting the sonar into an electric signal, a sonar transmitter, a sonar receiver, and a radio transmitter all controlled by a microprocessor included in a buoy which includes a fish finding detector. The microprocessor in the buoyant station generates sync pulses and transmits the converted sonar echo signals and sync signals to the shore station by a predetermined program, using a signal display which is controlled by a satellite or a radio receiver of the shore station and the microprocessor of the shore station.

As an example, the fish finding method of the U.S. Pat. No. 6,771,562 enables fishers to perform a fishing according to the following steps:

generating a stream of digital electric sync pulses;

transmitting sonar pulses from a buoyant station in response to sync pulses;

detecting sonar echoes at the buoyant station and generating electric echo signals in response thereto distinguishable from the sync pulses;

transmitting the electric echo signals to a radio receiver secured to the wrist of the fisherman; and displaying echo signals which follow a sync pulse generated in real time on a screen detachably secured to the wrist of the fisherman.

Here, the digital electric sync pulses are generated of a preselected waveform, and wherein the electric echo signals are generated in waveform different from that of the preselected sync pulses waveform.

As another example, the fish finding method of the U.S. Pat. No. 6,771,562 enables fishers to perform a fishing according to the following steps:

generating a stream of digital electric sync pulses of a preselected waveform;

transmitting sonar pulses from a buoyant station in response to sync pulses;

detecting sonar echoes at the buoyant station and generating electric echo signals in response thereto of waveform different from the preselected sync pulse waveform; and displaying echo signals which follow a sync pulse generated in real time on a screen secured to the fishing rod.

Here, the sync pulses are generated of a preselected pulse length, and wherein the electric echo signals are generated with pulse lengths less than that of the sync pulses.

As still another example, the fish finding system of the U.S. Pat. No. 6,771,562 enables fishers to perform a fishing including a buoyant station having a sonar transmitter, a sonar receiver a sonar to electric signal transducer and a radio transmitter all controlled by a microprocessor programmed to generate sync pulses and to transmit both the sync pulses and transduced sonar echo returns to a shore station having a radio receiver and signal display controlled by a shore station microprocessor that bears means for releasibly securing the shore station to an arm of a fisherman and wherein the shore station microprocessor is programmed to display only echo signals received after a sync pulse.

As yet another example, the fish finding system of the U.S. Pat. No. 6,771,562 enables fishers to perform a fishing including a buoyant station having a sonar transmitter, a sonar receiver, a sonar to electric signal transducer and a radio transmitter all controlled by a microprocessor programmed to generate sync pulses and to transmit both the sync pulses and transduced sonar echo returns to the shore station; a shore station having a radio receiver and signal display controlled by a shore station microprocessor programmed to display only echo signals received after a sync pulse that is mounted in a housing that bears means for releasibly securing the shore station to a fishing rod.

However, the above-described fishing detector which are respectively disclosed in the U.S. patents, has caused the following defects in a wireless transmission and reception system between an underwater sonar detector and a wireless receiver secured in a wrist.

That is, when considering various kinds of applications of a personal portable communications terminal such as audio reception, MP3 playing, digital multimedia broadcasting (DMB) reception, and navigation for personal portable communications service, a separate wrist-secured type receiver may cause a burden which has to prepare for a separate dedicate receiver in addition to the already-available personal portable communications terminal. Accordingly, there is a need to use the already-available portable mobile telephone as a wireless receiver which can receive and display the detection results of the fishing detector.

In the meantime, a known fish-shoal detector for fishing which is known to a wireless sound navigator disclosed in Japanese laid-open patent publication 2002-286841 embraces the following similar problems.

That is, in the fish-shoal detector disclosed in Japanese laid-open patent publication 2002-286841, a line is connected to a fishing rod end which is put on the ground. A detection function is included in a float connected to the line. The float provides a sonic generator on the bottom in order to generate a sound wave. The sound wave is reflected from the bottom of the sea floor or the underwater fish. In addition, the reflected sound wave is measured through a receiver. The reflected sound wave information is transmitted into a waveform. The waveform is analyzed through the receiver. The receiver calculates information of depth of water to then be indicated on a display.

This also includes the receiver which receives the sound wave and the waveform from the float to confirm various detection information. As a result, this may also include the defectives that a new telecommunications device should be provided as the receiver as well as a unit cost problem.

As described above, a variety of kinds of the underwater fishing detectors wirelessly transmit various states of distribution of fishes and the neighboring states into many kinds of signal waveform or image signals and receive and indicate them are known in various forms. However, these underwater fishing detectors are not applied to a personal communications terminal including a mobile telephone.

At present, many persons are familiar with a personal communications terminal which downloads a predetermined program and searches for a destination location during moving. Moreover, many persons receive many frequency bands of signals and listen to the music or receive/reproduce music files which are downloaded for themselves through a mobile telephone or a personal digital assistant (PDA). Many persons can receive and listen to various kinds of ground or satellite broadcasting signals like TV broadcasting signals through a mobile phone. Thus, it is difficult or unreasonable to prepare for devices corresponding to all kinds of such wireless transmit/receive devices.

As is well known, short-distance wireless mobile communications devices which are carried by hand or in bag are applied to the mobile phones, to thereby form a variety of kinds of wireless transmission-reception devices such as bluetooth, Zigbee, and RF equipment through which music can be listened to or phone callings can be made. As a result, various transmit and reception display devices need not be carried separately, but need to be switched through only a representative device by simple manipulation.

As described above, instead of a conventional high price and difficult-to-carry scale fish-shoal detector, as well as a sonar device such as a conventional dedicated fish catch device, there is a need to provide an inexpensive simple fishing detector for leisure which can measure the depth of water and/or the water temperature in a simple range. Accordingly, there is a need to provide an indicator which indicates the detection result as a degree of radiation of light emitting diodes or as a numerical display. Otherwise, there is a need to provide a detector integrated with a display. Further, there is a need to provide a display method which enables a personal portable communications terminal such as a mobile phone which most fishers carry, to display detection results.

SUMMARY OF THE INVENTION

To solve the above problems of the conventional art, it is an object of the present invention to provide an inexpensive fishing detector which can display detection results through a personal portable communications terminal which downloads several programs enabling detection for fishing, as well as which is integrated with a light-emitting indicator or a numerical indicator other than a wireless transmit/receive system.

It is another object of the present invention to provide a fishing detector which is light-emitted at a state where the detector hanging on a fishing rope is thrown to thereby enable a fisher to grasp distribution of fishes at a fishing site, and which enables the fisher to recognize a detail condition including the depth of water, the water temperature etc., through a predetermined switching after taking the detector out from the water.

In particular, it is still another object of the present invention to provide a fishing device which enables a fisher to confirm a detail condition including the depth of water, the water temperature etc., immediately after being put into an ice hole and then being taken out therefrom in the winter season.

It is yet another object of the present invention to provide a fishing detector which can display detection results through a personal portable communications terminal, as well as which enables a fisher to grasp the detection results through a light-emitting indicator or a numerical indicator.

It is still yet another object of the present invention to provide a fishing detector which enables a fisher to detect the depth of water, the water temperature, the fish distribution, etc., using a personal portable communications terminal such as a mobile phone, only with transmission and reception sound waves and wireless transmission and reception signals for transmitting the transmission and reception sound waves, in which light emitting elements are removed from the fishing detector.

It is a further object of the present invention to provide a fishing detector using a personal portable communications terminal employing a wireless transmit/receive system, in which the depth of water, the water temperature, the fish distribution, etc., are indicated through a display unit included in a handheld computer, a game console, a handheld navigator, etc., as well as a personal portable communications terminal such as a mobile phone or a PDA, using a known short-distance wireless transmission and reception device such as bluetooth.

To accomplish the above object of the present invention, there is provided a detector for fishing comprising: an ultrasonic sensor transmitting an ultrasonic signal into the water in a fishing site and receiving a reflective ultrasonic signal reflected from an underwater object; a control unit analyzing/determining the waveform of the reflective ultrasonic signal measured in the sensor to then be indicated on an indication unit; a switching unit having an elevating rod whose lower end contacts an activation switch to turn on/off electric power supplied from a power source and in the upper end of which a fishing line engagement hole is formed in which a fishing line is connected with the fishing line engagement hole and the elevating rod is exposed to the outside to then be elastically pressed to be opened and closed according to the pressure of the elevating rod; and a detector main body on the upper surface of which the indication unit is formed, and in which the sensor, the control unit, and the switching unit are embedded in a sealed manner with a predetermined structure.

Preferably, the indication unit comprises at least one of a light-emission indicator, a numeric indicator, and a water depth/temperature indicator, in order to indicate the depth of water, the temperature of water, the distribution of fishes including fishes' migration and/or the length of fishes.

Preferably, the control unit comprises a printed circuit board on which a microcomputer, the activation switch, the light-emission indicator, a numeric indicator, the power source, and a power source case are installed.

Preferably, the fishing detector further comprises a temperature sensor.

Preferably, the fishing detector further comprises a sinker for the center of gravity in order to form the center of gravity of the detector main body downwards.

Preferably, the fishing detector further comprises a transmitter wirelessly transmitting a signal representing the analyzed/determined result in the form of a predetermined waveform, so that the wireless signal transmitted from the transmitter in the fishing detector is received by a predetermined remote receiver and displayed on a display included in the predetermined remote receiver, using a predetermined program.

Preferably, the display is a personal portable communications terminal.

Preferably, the display is a personal computer.

Preferably, the display is a game console.

Preferably, the display comprises an adapter and a personal portable communications terminal which receives the wireless signal from the transmitter in the fishing detector.

Preferably, the personal portable communications terminal is a portable mobile phone.

Preferably, the adapter is a dedicated short range communications unit.

Preferably, the fishing detector further comprises positive and negative connection terminals which are turned on if the main body of the detector is submerged under water, and which are turned off if the former is pulled up from the latter.

According to another aspect of the present invention, there is also provided a detector for fishing comprising: an ultrasonic sensor transmitting an ultrasonic signal into the water in a fishing site and receiving a reflective ultrasonic signal reflected from an underwater object, to thereby analyze/determine the waveform of the reflective ultrasonic signal measured in the sensor; and a transmitter wirelessly transmitting a signal representing the analyzed/determined result in the form of a predetermined waveform, so that the wireless signal transmitted from the transmitter is received by a remote receiver and displayed on a display included in the remote receiver, using a predetermined program, wherein a fishing line is connected with a fishing line engagement hole which is formed on the outside of the detector.

According to still another aspect of the present invention, there is also provided a detector system for fishing comprising: a detector comprising: an ultrasonic sensor transmitting an ultrasonic signal into the water in a fishing site and receiving a reflective ultrasonic signal reflected from an underwater object, to thereby analyze/determine the waveform of the reflective ultrasonic signal measured in the sensor; and a transmitter wirelessly transmitting a signal representing the analyzed/determined result in the form of a predetermined waveform, using a predetermined program, wherein a fishing line is connected with a fishing line engagement hole which is formed on the outside of the detector; and a remote receiver receiving and processing the wireless signal transmitted from the transmitter in the detector and displaying the processed result on a display included in the remote receiver.

Preferably, the fishing detector system further comprises a switching unit having an elevating rod whose lower end contacts an activation switch to turn on/off electric power supplied from a power source and in the upper end of which the fishing line engagement hole is formed in which a fishing line is connected with the fishing line engagement hole and the elevating rod is exposed to the outside to then be elastically pressed to be opened and closed according to the pressure of the elevating rod.

Preferably, the detector comprises a control unit to analyze/determine the waveform of the reflective ultrasonic signal measured in the sensor, the control unit comprising a printed circuit board on which a microcomputer, the activation switch, the light-emission indicator, a numeric indicator, the power source, and a power source case are installed.

BRIEF DESCRIPTION OF THE DRAWINGS

The above and/or other objects and/or advantages of the present invention will become more apparent by describing the preferred embodiment thereof in more detail with reference to the accompanying drawings in which.

DETAILED DESCRIPTION OF THE INVENTION

A variety of detectors for fishing according to respective preferred embodiments of the present invention will be described with reference to the accompanying drawings.

Figure 1:
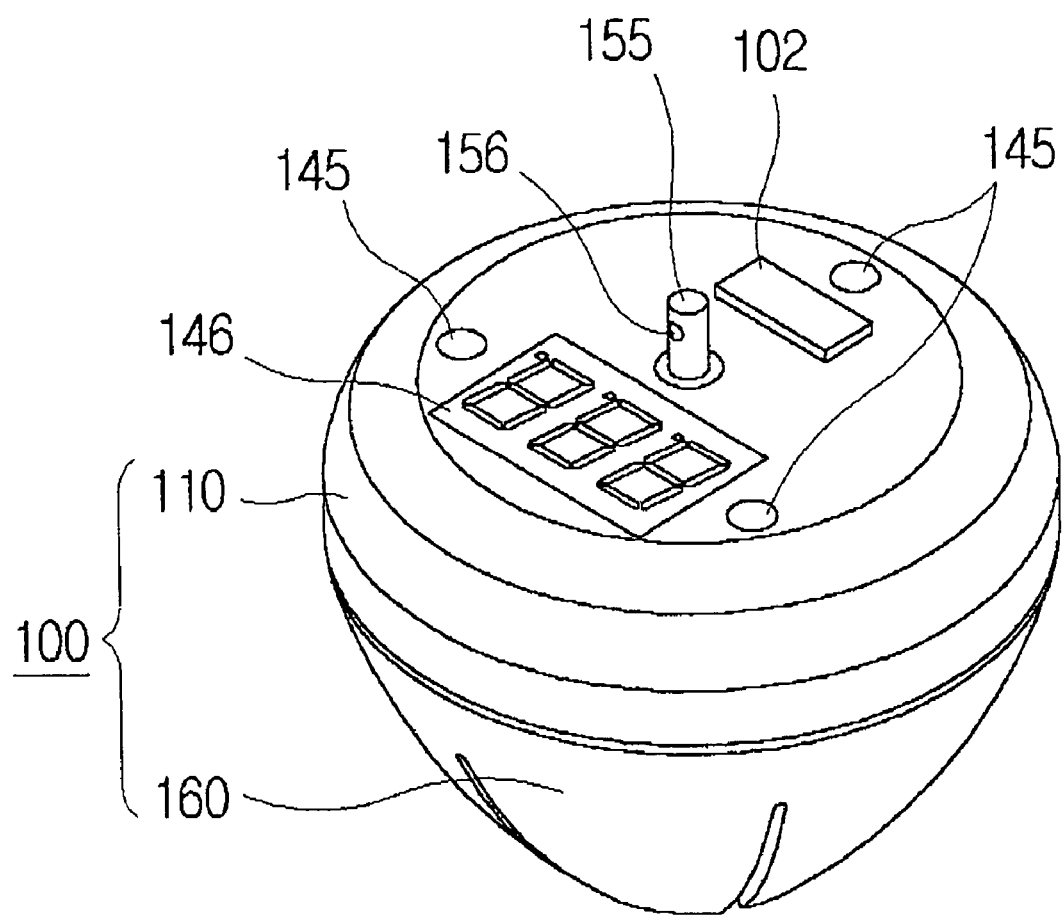
FIG. 1 is a perspective view showing an external appearance of a detector for fishing according to the present invention.

FIG. 1 is a perspective view showing an external appearance of a detector for fishing according to a first embodiment of the present invention.

As shown in FIG. 1, a main body 100 of a fishing detector according to the present invention has an external appearance of a tumbler shape whose inner and outer portions have a water-tight structure in which an upper cover 110 and a lower cover 160 are assembled with screws. As will be described later, an O-ring 170 is interposed between the upper cover 110 and the lower cover 160 to thereby maintain water-tightness therebetween. An elevating rod 155 which includes an engagement hole 156 to be describes later is exposed at the center of the upper surface.

Three light-emission indicators 145, a numeric indicator 106, and a water depth/temperature indicator 106 which alternately indicates water depth/temperature are formed on the upper side of the upper cover 110, in addition to an elevating rod 155.

The water depth/temperature can be alternately indicated in the water depth/temperature indicator 102 by pressing the water depth/temperature indicator 102. However, it is preferable that the water depth/temperature indicator 102 is designed to automatically indicate the water depth/temperature without manipulating the water depth/temperature indicator 102.

A fishing line is engaged into the engagement hole 156 formed in the detector main body 100 at an initial time of fishing. When the exposed elevating rod 155 is repetitively pressed, a built-in power activation switch 142 is repeatedly turned on/off. Accordingly, an internal electric circuit is turned on/off.

Figure 2:
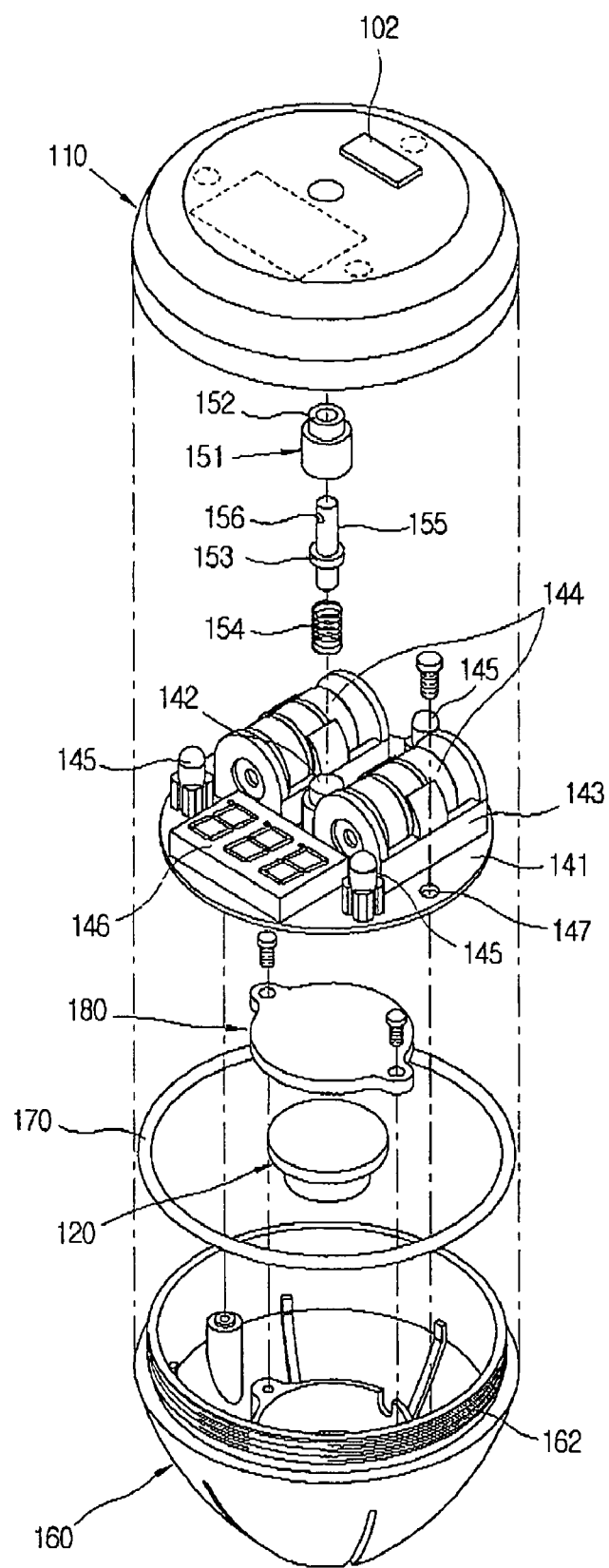
FIG. 2 is a disassembled perspective view of the fishing detector according to the present invention.
Figure 3:
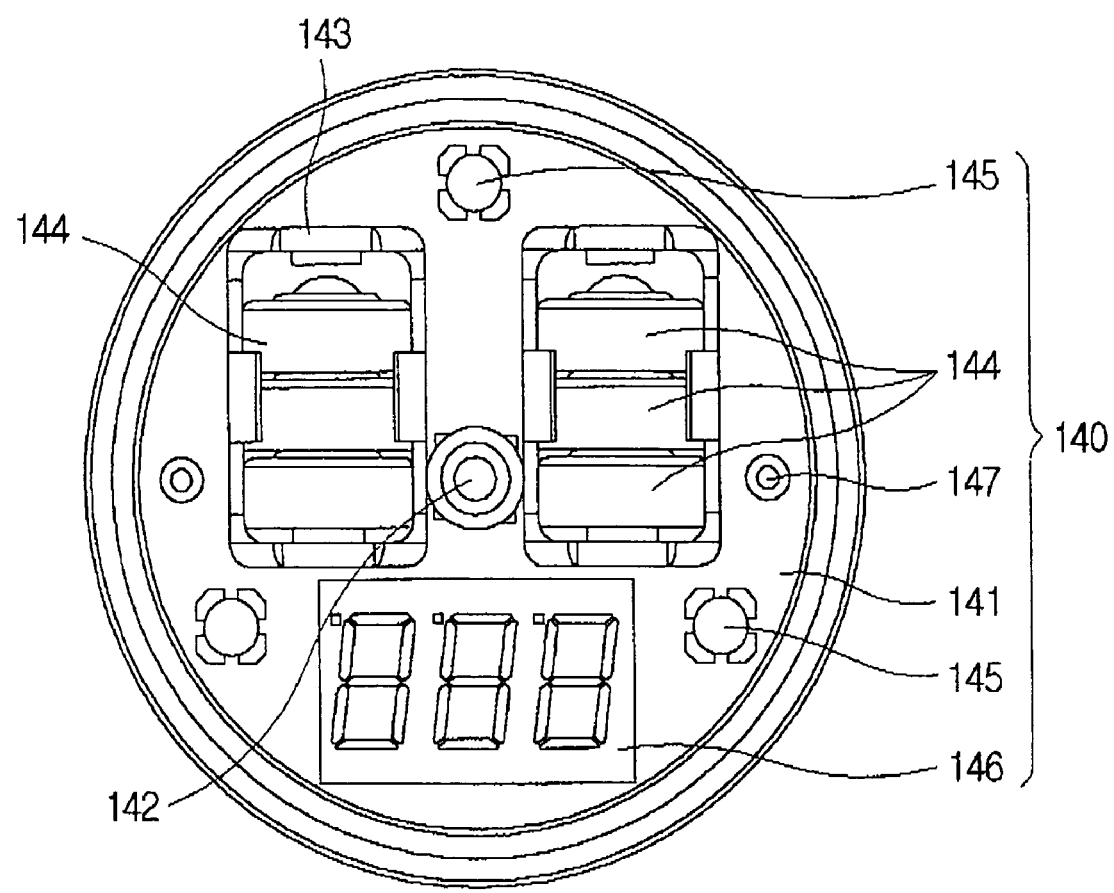
FIG. 3 is a plan view showing the open state of the top cover of the fishing detector according to the present invention.
Figure 4:
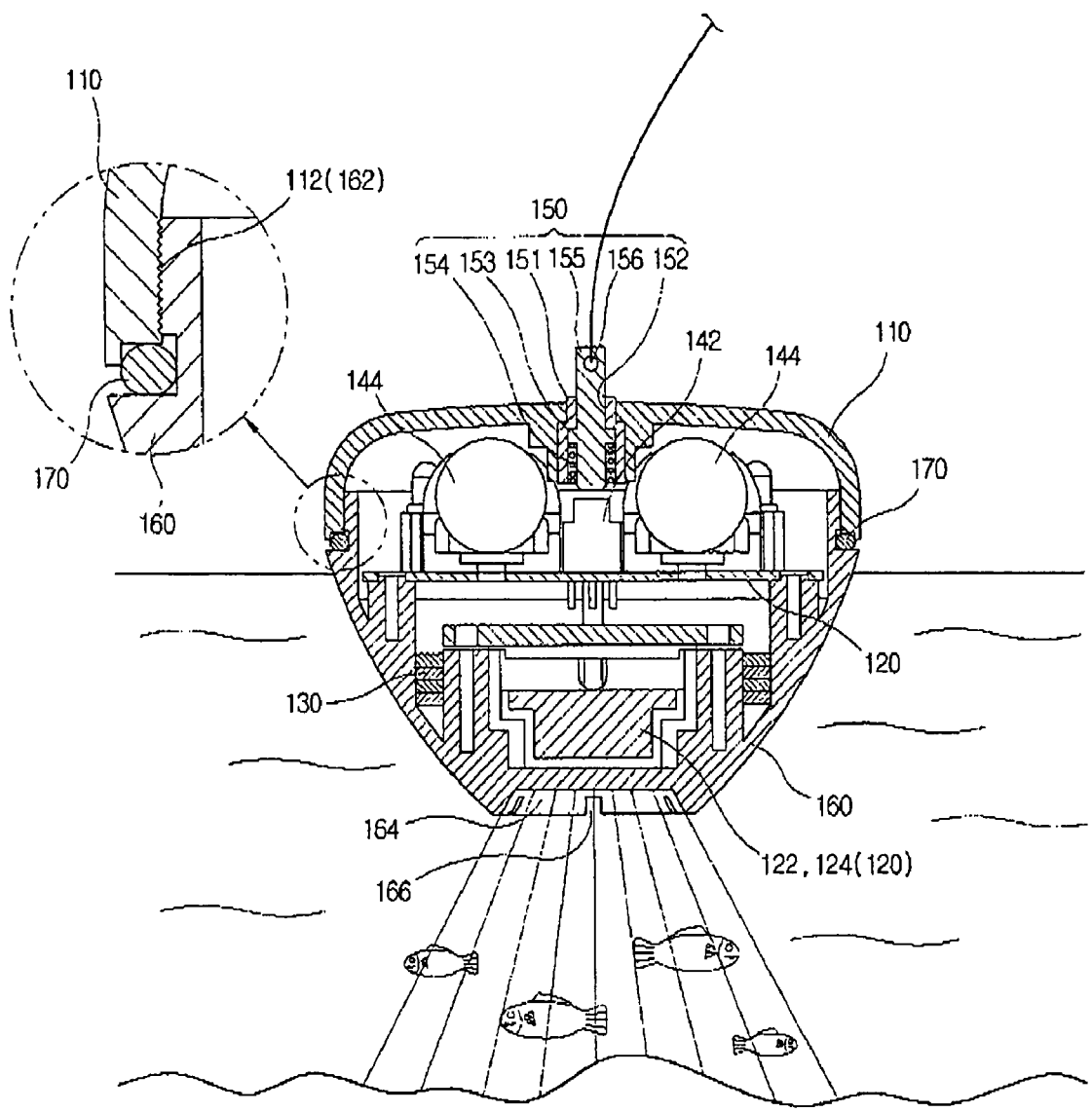
FIG. 4 is a cross-sectional view of the assembled state of the fishing detector according to the present invention.

FIG. 2 is a disassembled perspective view of the fishing detector according to the present invention. FIG. 3 is a plan view showing the open state of the top cover of the fishing detector according to the present invention. FIG. 4 is a cross-sectional view of the assembled state of the fishing detector according to the present invention.

As shown in FIGS. 2-4, a fishing detector according to an embodiment of the present invention includes: a detector main body 100; a sensor unit 120; a sinker 130; a control unit 140; and a switching unit 150.

The detector main body 100 consists of an upper cover 110 and a lower cover 160.

The sensor unit 120 includes an ultrasonic sensor 122 and a temperature sensor 124 in a sealed space of the detector main body 100, and which transmits and receives a predetermined signal in order to measure the depth of water, the water temperature, and the lengths of fishes in a target place of a fishing site.

The sinker 130 is built in at a predetermined position of the lower cover 160 in order to maintain the center of gravity.

The control unit 140 calculates a variety of the depths of water up to the floor of water, to then indicate an average water depth, as well as detects the lengths of the fishes through the signal from the sensor unit 120, and numerically indicates the water temperature. For this purpose, the control unit 140 outputs predetermined signals to make the three light-emission indicators 145, the numeric indicator 106, and the water depth/temperature indicator 106 operate, respectively.

The sinker 130 for maintaining the center of gravity is laminated in the inner side of the lower cover 160 in a ring shape. The center of gravity can be adjusted by increment/reduction of the number of laminations.

The detector main body 100 of the sealed structure is screwed and jointed by screw connections 112 and 162 between the upper cover 110 and the lower cover 160 as will be described later. An O-ring 170 is interposed between the screw connections 112 and 162 to thereby increase the sealed force.

Additionally, a supporting plate 180 is fixed on top of the sensor unit 120 with a connecting member in order to support the sensor unit 120 and prevent the movement of the sinker 130 for the center of gravity.

The lower cover 160 applied in the present invention has a structure that the lower portion is blocked in which that the bottom portion is formed of a concave portion 164 and grooves 166 are formed towards the concave portion 164 to communicate with one another at the outer edges. This is to prevent an unnecessary adhesion force from generation in the detector main body 100 by making the grooves 166 towards the concave portion 164 communicated with the outside at the throwing moment.

In the meantime, where the detector is made to operate with the bottom of the lower cover 160 opened, it is necessary that rubber packings seal the bottom and the surrounding portion of the sensor unit 120 in order to protect the assembly part of the sensor unit 120 from being soaked. However, since such operation of the sealing unit is general, the detailed description will be omitted in the present invention.

As described above, the above-described sensor unit 120 includes an ultrasonic sensor 122 which generates an ultrasonic signal toward the water floor in a predetermined angular range of approximately 90° and receives reflective signals of various kinds of angles representing the depth of water of the floor, to then obtain an average value of the water depth, and analyzes the signal waveform reflected from moving objects, and measure the length of the moving object, to then output a predetermined signal, and a temperature sensor 124 for indicating the water temperature of the surface of the water contacting in the outer surface of the detector main body 100.

The length measurement of the moving objects including fishes is performed by the following steps. That is, a reflection waveform is measured in the front and rear range of a transmitted signal waveform, and the length of a part of the measured reflection waveform is measured. Then, the measured length is compared with three ranges of preset values, in which the three ranges are set as large, middle, and small. As a result, the comparison result is indicated as the measured result. The detailed indicating method will be described later.

The sinker 130 for the center of gravity is laminated in the form of a ring in the periphery of the sensor unit 120 on the lower cover 160, and thus makes the center of gravity of the detector main body 100 positioned in the lower portion of the detector main body 100. Accordingly, the whole detector main body 100 always stands erect like a tumbler.

As to the control unit 140, the activation switch 142 contacting in the elevating rod 155 is fixed to the central portion of a predetermined printed circuit board 141. A battery case 143 containing several batteries 144 is mounted to either side of the activation switch 142. Three light-emission indicators 145 which are light emitted through a respective light emission lamp which is protruded from the outside of the detector main body 100, and a numeric indicator 146 which indicates numeric results through a numeric indication window which is located on the detector main body 100 are installed in the printed circuit board 141. The printed circuit board 141 is fixed with bolts via bolt holes 147 formed in the lower cover 160.

Figure 5:
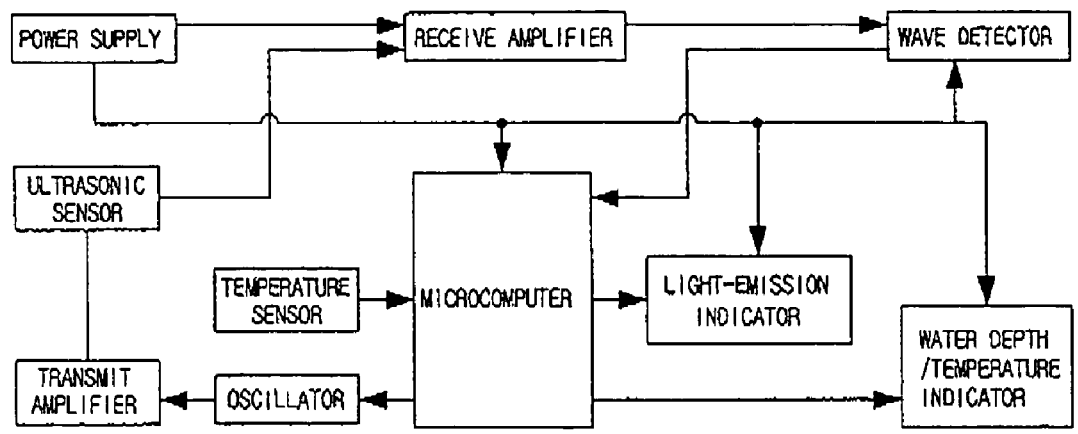
FIG. 5 is a block diagram of the fishing detector according to the present invention.

The printed circuit board 141 in the control unit 140 is illustrated with reference to a block diagram of FIG. 5.

The printed circuit board 141 in the control unit 140 forms a predetermined circuit. The circuit formed in printed circuit board 141 includes: an oscillator of 220 KHz; a transmit amplifier B amplifying a transmit signal; a receive amplifier C amplifying the signal received from the sensor unit 120 including the ultrasonic sensor; a wave detector D; a microcomputer E comparing the sizes and times of the received signals while outputting the oscillated result, and outputting the depth of water, the water temperature, and the lengths of fishes, and an indication unit which is emitted through the light-emission indicators 145 by three colors or simultaneously, and which indicates the water depth transferred from the ultrasonic sensor and the water temperature transferred from the temperature sensor 124 through the numeric indicator 146 numerically indicating the water depth/temperature, according to the signals output from the microcomputer E, that is, under the control of the microcomputer E.

The switching unit 150 is widely opened at the lower portion thereof. A support cap 151 forming a narrow penetration hole 152 is formed in the upper portion thereof. An elevating rod 155 ascends and descends through the penetration hole 152 of the support cap 151. A girth 153 is formed in the middle portion of the elevating rod 155. The bottom of the elevating rod 155 contacts the activation switch 142. An engagement hole 156 through which a fishing rope is engaged is formed in the upper portion of the elevating rod 155. An elastic member 154 is elastically attached to the lower side of the girth 153 of the elevating rod 155 to thereby make the elevating rod 155 always restored upwards. The elastic member 154 is elastically supported to the support cap 151 and thus the elevating rod 155 is elastically installed.

Figure 6:
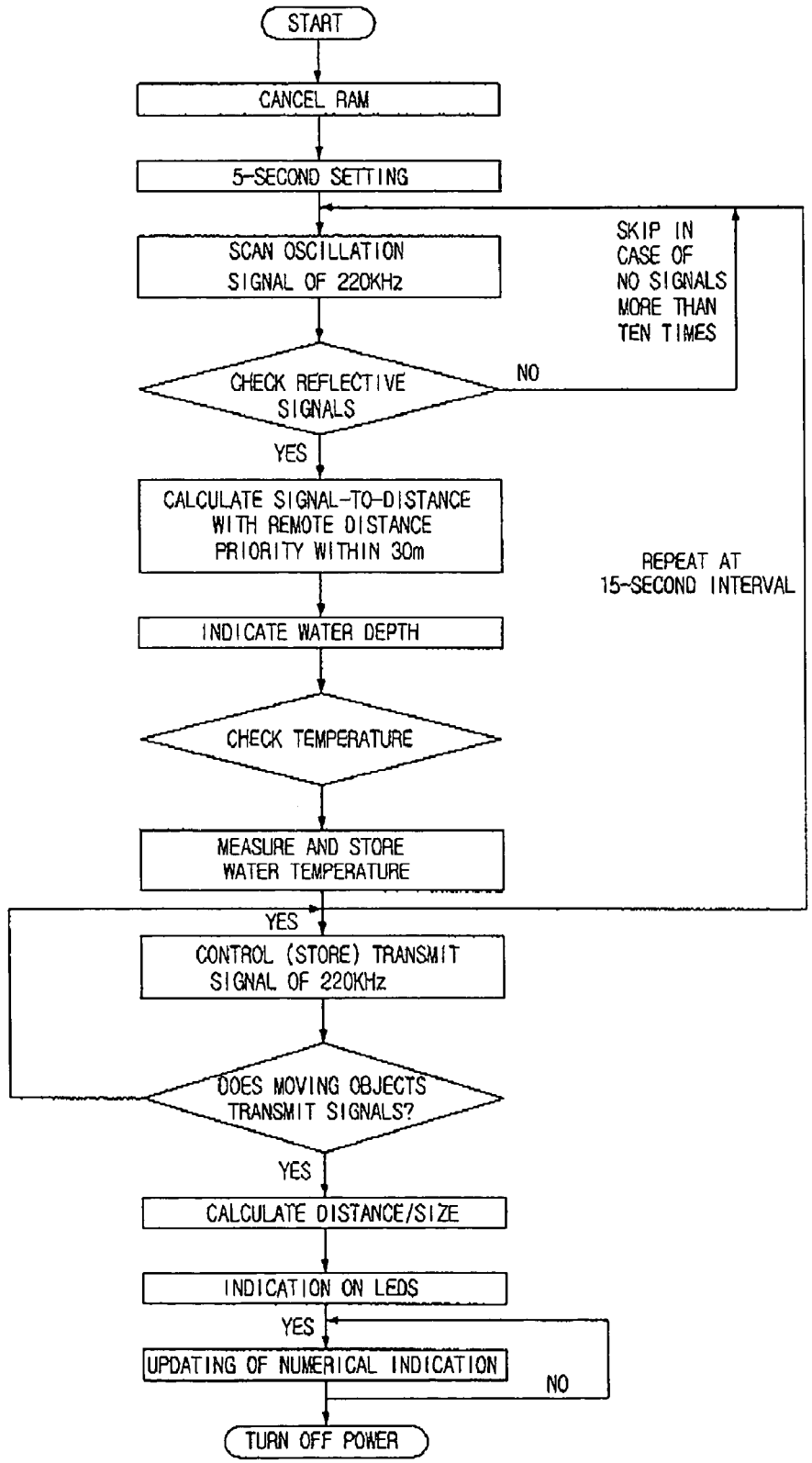
FIG. 6 is a flow-chart view for explaining the operation of the fishing detector according to the present invention.

FIG. 6 is a flow-chart view for explaining the operation of the fishing detector according to the present invention.

According to the flow-chart of FIG. 6, the procedure that the depth of water and the lengths of fishes are measured and indicated will be described, which is programmed to repeat or perform the procedure illustrated in the flow-chart stored in the microcomputer E according to the present invention.

For example, an oscillated/amplified signal is transmitted. Then, a reflective signal is checked with a remote distance priority within thirty meters. The reflective signal is received and accepted in the microcomputer E after having passed through the amplifier C and the wave detector D. Thereafter, the reflective signal is compared with a predetermined comparison signal, in size and time. A double of the underwater sound velocity celerity is divided into two according to the reflective time to thereby calculate a distance. As a result, the water depth/temperature can be indicated through the light-emission indicators 145 and the water depth/temperature numeric indicator 146. The detailed description of the flow-chart operation process of the microcomputer E will be omitted because of the inherent function of the microcomputer.

As described above, if an average depth of water up to the floor is stored according to the oscillation signal, the signals representing the lengths of the moving objects are transmitted and received.

If a signal representing that the length of the moving object is less than fifteen centimeters is checked more than once, one light-emission indicator 145 is flickered. If a signal representing that the length of the moving object is between fifteen centimeters and thirty centimeters is checked more than once, two light-emission indicators 145 are flickered. If a signal representing that the length of the moving object is more than thirty centimeters is checked more than once, three light-emission indicators are flickered. Here, the reflective signal by the supersonic transmission signal is be measured through a predetermined waveform analysis. Alternatively, the lengths of the moving objects can be indicated by color lamps. That is, a green lamp is turned on in case of fifteen centimeters or less, a red lamp is turned on in case of fifteen to thirty centimeters, and a yellow lamp is turned on in case of thirty centimeters or more.

Therefore, in the case that one light-emission indicator 145 is flickered, it is determined that fishes of fifteen centimeters or less are intermittently migrating in the water. In the case that two light-emission indicators 145 are flickered, it is determined that fishes of fifteen to thirty centimeters are migrating in the water. In this case, to some extent, it is determined that it is possible to do fishing. In the case that three light-emission indicators 145 are flickered, it is determined that many fishes as well as fishes of thirty centimeters or more are migrating in the water. In this case, it is determined that it is appropriate to do fishing.

The accuracy of the waveform analysis depends on the sensing ability of the ultrasonic sensor and the performance of the microcomputer. However, the distribution of fishes, the depth of water, and the water temperature can be grasped through the fishing detector according to the present invention at the throwing location of the fishing rope.

In the case that a fisher does actually fishing, a fishing detector according to the present invention simply hang on the fishing rope and is thrown to the fishing location in the field. In this case, the distribution of the fishes and the depth of water can be grasped as the flickering or colors of the above-described light-emission indicators. After having recollected the fishing detector, the water depth/temperature indicator 102 is pressed to grasp the depth of water and the water temperature. Then, the preparations for appropriate fishing are made in order to do an effective fishing.

In the meantime, the present invention uses a mixture of the light-emission lamps and the color lamps as the light-emission indicators which is applied to the fishing detector according to the present invention. Alternatively, the present invention uses a transmitter to wirelessly transmit information on the distribution of the fishes and the depth of water to an independent mobile phone which enables a fisher to detect the distribution of the fishes and the depth of water.

Figure 7:
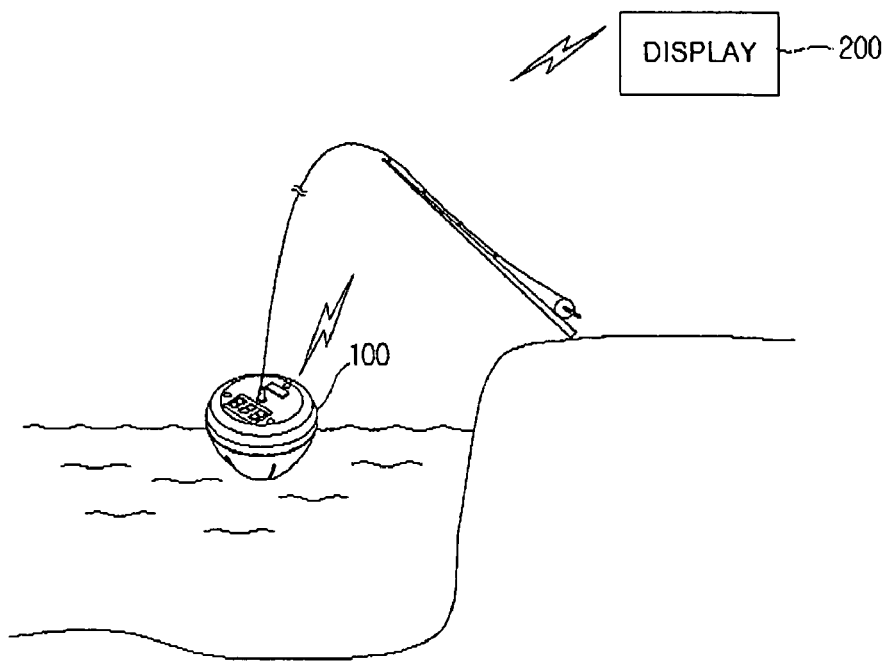
FIG. 7 is a schematic view for explaining a fishing detector system according to another preferred embodiment of the present invention.
Figure 8:
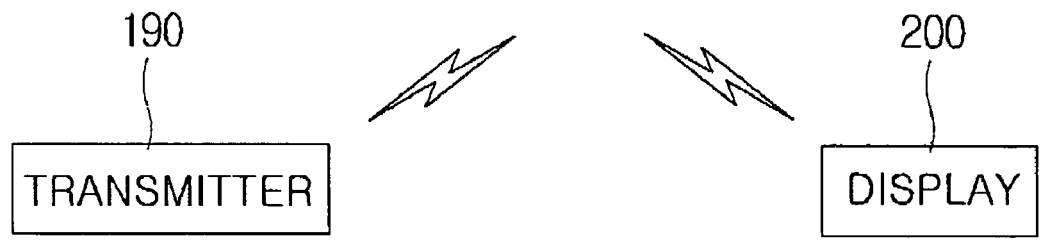
FIG. 8 is a schematic block diagram for explaining the fishing detector system of FIG. 7.
Figure 9:
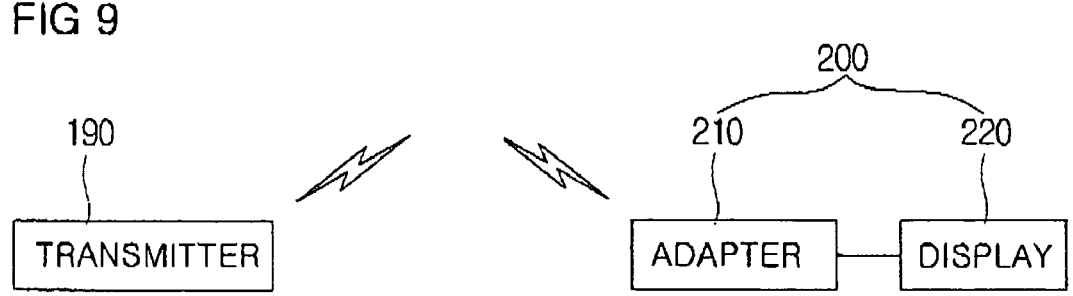
FIG. 9 is a schematic block diagram for explaining a fishing detector system according to still another preferred embodiment of the present invention.

FIG. 7 is a schematic view for explaining a fishing detector system according to another preferred embodiment of the present invention. FIG. 8 is a schematic block diagram for explaining the fishing detector system of FIG. 7. FIG. 9 is a schematic block diagram for explaining a fishing detector system according to still another preferred embodiment of the present invention.

Referring to FIGS. 7 through 9, the fishing detector system schematically includes a detector 100 and a display 200.

Firstly, the detector 100 is nearly the same as that of the above-described previous embodiment of the present invention. However, the detector according to the present embodiment differs from that of the previous embodiment in a point of view that the eye confirmation display means such as light-emission indicators and the numeric indicator are removed from the detector, but the detector further includes a transmitter 190 transmitting a wireless signal output from the control unit 140 in the detector 100 to a display 200 employing a wireless receive mode. Accordingly, the distribution of the fishes and/or the depth of water can be displayed on the display 200.

That is, the detector main body 100 of the present invention includes the sensor unit 120 which transmits and receives the water depth measurement signal such as the ultrasonic wave, to thereby measure the depth of water, and which detects the lengths of the moving objects in the range of the reflective signals reflected from the moving objects. In addition, the detector main body 100 of the present invention also includes the control unit 140 formed in a printed circuit board on which a microcomputer G, batteries 144 which are a kind of a portable power supply, a battery case 143 and a transmitter 190 are installed so that the waveform of the reflective signal measured in the sensor unit 120 is analyzed to detect the lengths of the migrating fishes and transmit the detected result as a predetermined transmit signal. Furthermore, the detector main body 100 of the present invention also includes a ring-shaped hook 109 into which a fishing rope is connected and which is exposed from the outer upper surface of the detector. In addition, the detector main body 100 of the present invention also includes an upper cover 110 and a lower cover 160 in order to have a sealed structure between the sensor unit 120 and the control unit 140 as in the previous embodiment.

The sensor unit 120 further includes a temperature sensor 124. Furthermore, the detector according to the present invention includes a sinker 130 for the center of gravity in the lower portion of the detector in order to have the center of gravity downwards to thereby maintain the detector stand erect.

The detector having the above-described configuration transmits and receives the water depth measurement signal, to thereby measure the depth of water, and analyzes the waveform of the reflective signals including the distribution of the moving objects and temperature reflected from the moving objects in the range of the reflective signals. The transmitter 190 transmits the analyzed waveform signal. Then, the display 200 wirelessly receives the waveform signal transmitted from the transmitter 190 in order to display it thereon as waveform or images.

Here, the display 200 can be implemented using a personal computer, a personal portable communications terminal such as a mobile phone or a personal digital assistant (PDA) or a game console.

The display 200 includes an adapter 220 and a personal portable communications terminal 220 separately. Here, the adapter 220 includes an operating switch and a connection jack so as to be connected with the mobile phone. The adapter 210 can be implemented into a short-distance or local area network wireless communications device such as bluetooth, Zigbee, or RF equipment.

Here, the connection jack is preferably inserted in a communications linkage port of a personal portable device.

If the fishing detector 100 having the above-described configuration according to the present invention is thrown into the water after having removed a fishing hook from the fishing rope at the initial time of fishing and hang the fishing rope on the ring-shaped hook 109 formed in the detector, the detector is automatically turned on and thus at the same time, a predetermined on-board circuitry operates to be automatically turned on.

Figure 10:
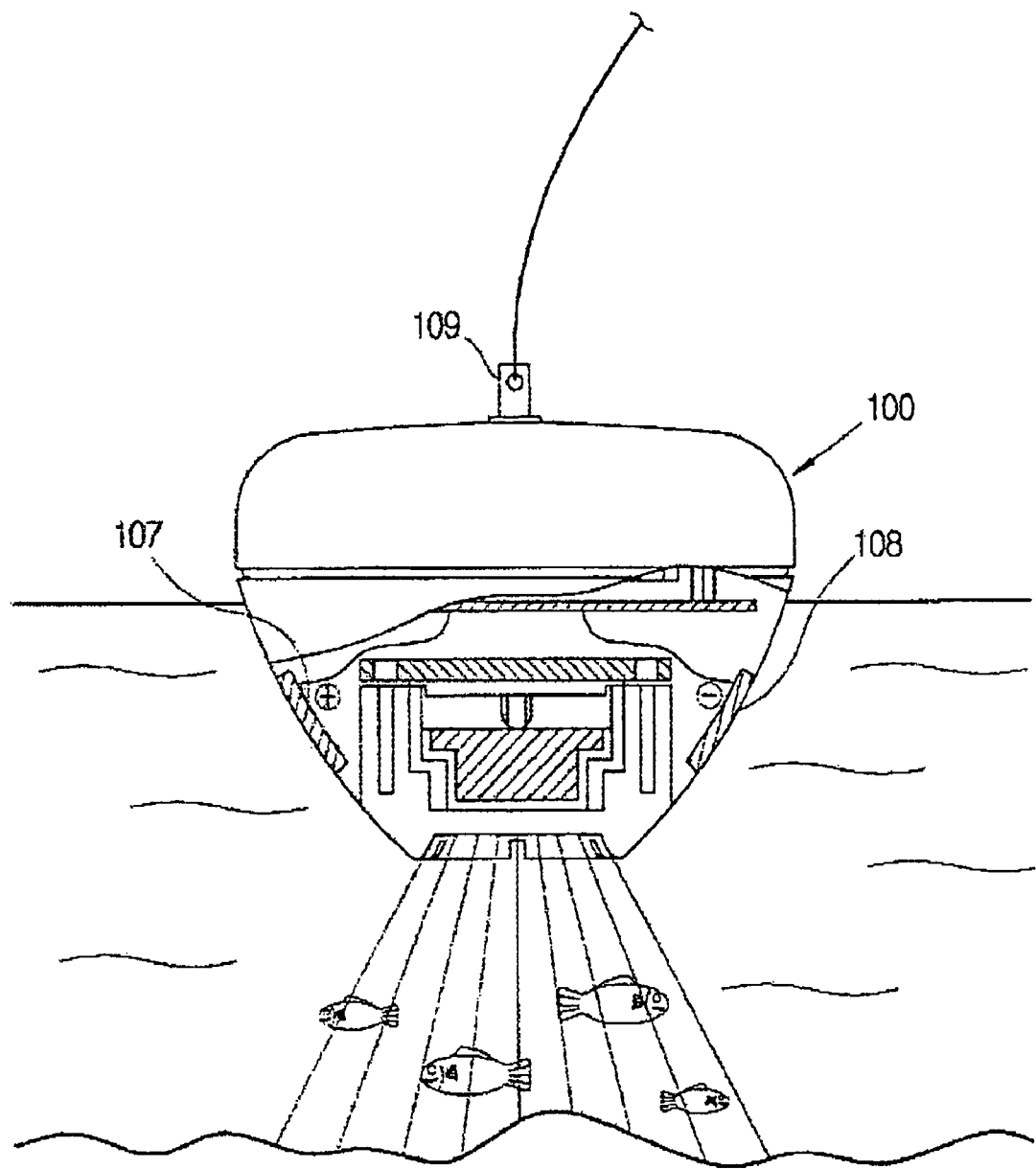
FIG. 10 is a schematic partial cross-sectional view showing another example of a switching unit implemented in the fishing detector according to the present invention.

FIG. 10 is a schematic partial cross-sectional view showing another example of a switching unit implemented in the fishing detector according to the present invention. Referring to FIG. 10, an automatic turn-on switching structure of the fishing detector will be described.

As shown in FIG. 10, the positive and negative terminals 107 and 108 which are formed in the outer side of the detector 100, are electrified as soon as the detector is thrown to the water, and the electric power is supplied from the inside batteries, to thereby enable the wireless-transmitting function including the predetermined sensing operation, waveform analysis, and transmission to be initiated.

The thrown detector 100 shoots the ultrasonic signals in a predetermined range by action of the internal ultrasonic sensor 122. The ultrasonic signals are transmitted from internal ultrasonic sensor 122 as predetermined amplified signals through the oscillator circuit A and the amplifier circuit B controlled by the microcomputer E which is shown in FIG. 5. Accordingly, it is possible to perform a check function including the depth of water and the lengths of fishes. Besides, the other known sensor units can be applied to the ultrasonic sensor.

Since a checking function including the depth of water, etc., is repeated according to the flow-chart in the microcomputer E which is shown in FIG. 6 as described above, the detailed description thereof will be omitted.

As described above, the wireless fishing detector system enables the display 200 to receive the output signal of the detector 100 equipped with the ordinary wireless transmitter 190, and to display the depth of water, the water temperature, the lengths of the objects, and distribution of the fishes as numerical data or density of waveform, through an already programmed display course.

The display 200 includes an adapter 220 and a personal portable communications terminal 220 separately. Here, the adapter 220 includes an operating switch and a connection jack so as to be connected with the mobile phone. The adapter 210 can be implemented into a short-distance or local area network wireless communications device such as bluetooth, Zigbee, or RF equipment.

Various kinds of display methods including waveform or images can be used instead of the numeric data or luminance of the flashed color of the previous embodiment.

That is, the transmitter 190 can be implemented into a digital image signal modulator transforming and outputting an analog receipt signal input from the underwater ultrasonic wave transmission and reception unit into a digital video signal after passing through amplification, signal gain conversion, signal transform conversion, and micro-processing. The display 200 is implemented into a personal portable communications terminal which internally stores a program in order to make the digital video output signal displayed thereon as a real-time video signal. Accordingly, the real-time video image of the underwater object can be displayed on the personal portable communications terminal. Accordingly, the detector system can be implemented using the fishing detector having the transmitter which includes the digital video signal modulator, and the personal portable communications terminal which can be applied as the display.

Moreover, the underwater situation can be confirmed as the image screen, as well as the density of the waveform, or the numeric data through the computer, personal portable communications terminal, mobile phone, and game console etc. The known dedicated short-range wireless communications device can be applied to the cellular phone added type adapter and adhered to the cellular phone whenever necessary. It can be determined whether or not to do fishing through the detector thrown at the fishing site.

In this way, the present invention has the effect that provides the fishing detector which measures readily the depth of water and the water temperature at the fresh or sea fishing site to which the detector has been thrown in a simple structure through the ultrasonic sensor, the temperature sensor, and the microcomputer, and confirms the distribution range of the fishes as the light-emitted number or the color illumination, without purchasing the expensive equipment like the professional purposed sonar.

The present invention has the effect that provides the wireless fishing detector system which includes a detector for detecting the average depth of water, the water temperature, and the distribution of fishes at a specific location, to then be displayed as the light-emitted number or the color illumination, and a display which is included in the personal portable communications terminal, to thereby display the average depth of water, the water temperature, and the distribution of fishes. Accordingly, it can be determined whether or not to do fishing through the detector thrown at the fishing site.

The present invention has the effect that provides the wireless fishing detector system which includes a detector having a transmitter for converting the average depth of water, the water temperature, and the distribution of fishes into a particular signal and a personal portable communications terminal which wirelessly receives the particular signal through a wireless short-distance transmit and receive unit or a personal portable communications terminal to which a wireless short-distance transmit and receive unit is attached. Accordingly, it can be determined whether or not to do fishing through the detector thrown at the fishing site.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A detector for fishing comprising: an ultrasonic sensor transmitting an ultrasonic signal into the water in a fishing site and receiving a reflective ultrasonic signal reflected from an underwater object; a control unit analyzing/determining the waveform of the reflective ultrasonic signal measured in the sensor to then be indicated on an indication unit; a switching unit having an elevating rod whose lower end contacts an activation switch to turn on/off electric power supplied from a power source and in the upper end of which a fishing line engagement hole is formed in which a fishing line is connected with the fishing line engagement hole and the elevating rod is exposed to the outside to then be elastically pressed to be opened and closed according to the pressure of the elevating rod; and a detector main body on the upper surface of which the indication unit is formed, and in which the sensor, the control unit, and the switching unit are embedded in a sealed manner with a predetermined structure.

2. The fishing detector according to claim 1, wherein the indication unit comprises at least one of a light-emission indicator, a numeric indicator, and a water depth/temperature indicator, in order to indicate the depth of water, the temperature of water, the distribution of fishes including fishes' migration and/or the length of fishes.

3. The fishing detector according to claim 1, wherein the control unit comprises a printed circuit board on which a microcomputer, the activation switch, the light-emission indicator, a numeric indicator, the power source, and a power source case are installed.

4. The fishing detector according to claim 1, further comprising a temperature sensor.

5. The fishing detector according to claim 1, further comprising a sinker for the center of gravity in order to form the center of gravity of the detector main body downwards.

6. The fishing detector according to claim 1, further comprising a transmitter wirelessly transmitting a signal representing the analyzed/determined result in the form of a predetermined waveform, so that the wireless signal transmitted from the transmitter in the fishing detector is received by a predetermined remote receiver and displayed on a display included in the predetermined remote receiver, using a predetermined program.

7. The fishing detector according to claim 6, wherein the display is a personal portable communications terminal.

8. The fishing detector according to claim 6, wherein the display is a personal computer.

9. The fishing detector according to claim 6, wherein the display is a game console.

10. The fishing detector according to claim 6, wherein the display comprises an adapter and a personal portable communications terminal which receives the wireless signal from the transmitter in the fishing detector.

11. The fishing detector according to claim 10, wherein the personal portable communications terminal is a portable mobile phone.

12. The fishing detector according to claim 10, wherein the adapter is a dedicated short range communications unit.

13. The fishing detector according to claim 1, further comprising positive and negative connection terminals which are turned on if the main body of the detector is submerged under water, and which are turned off if the former is pulled up from the latter.

14. A detector system for fishing comprising: a detector comprising: an ultrasonic sensor transmitting an ultrasonic signal into the water in a fishing site and receiving a reflective ultrasonic signal reflected from an underwater object, to thereby analyze/determine the waveform of the reflective ultrasonic signal measured in the sensor; and a transmitter wirelessly transmitting a signal representing the analyzed/ determined result in the form of a predetermined waveform, using a predetermined program, wherein a fishing line is connected with a fishing line engagement hole which is formed on the outside of the detector; and a remote receiver receiving and processing the wireless signal transmitted from the transmitter in the detector and displaying the processed result on a display included in the remote receiver, further comprising a switching unit having an elevating rod whose lower end contacts an activation switch to turn on/off electric power supplied from a power source and in the upper end of which the fishing line engagement hole is formed in which a fishing line is connected with the fishing line engagement hole and the elevating rod is exposed to the outside to then be elastically pressed to be opened and closed according to the pressure of the elevating rod.

15. The fishing detector system according to claim 14, wherein the detector comprises a control unit to analyze/determine the waveform of the reflective ultrasonic signal measured in the sensor, the control unit comprising a printed circuit board on which a microcomputer, the activation switch, the light-emission indicator, a numeric indicator, the power source, and a power source case are installed.

* * * * *